W. NOBLE.
SLEEVE VALVE ENGINE.
APPLICATION FILED MAY 12, 1919.

1,384,401.

Patented July 12, 1921.
3 SHEETS—SHEET 1.

Inventor
Warren Noble
by Wright, Brown, Quinby & Hay
Attorneys

W. NOBLE.
SLEEVE VALVE ENGINE.
APPLICATION FILED MAY 12, 1919.
1,384,401. Patented July 12, 1921.
3 SHEETS—SHEET 2.
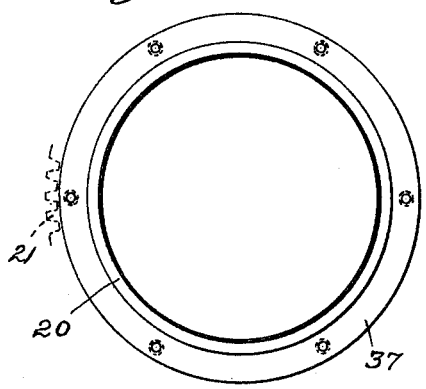
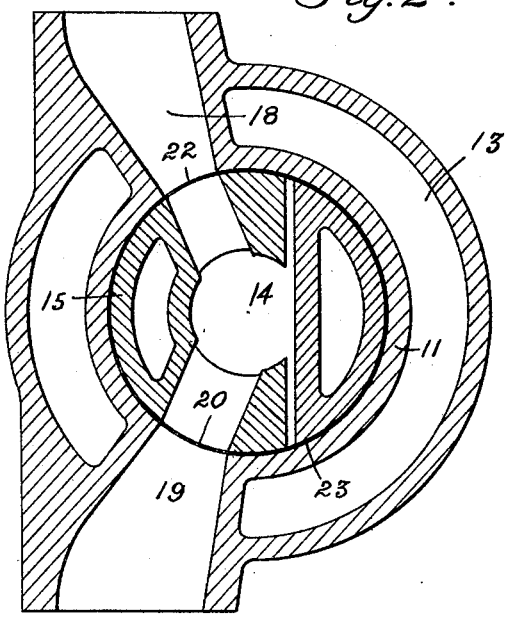
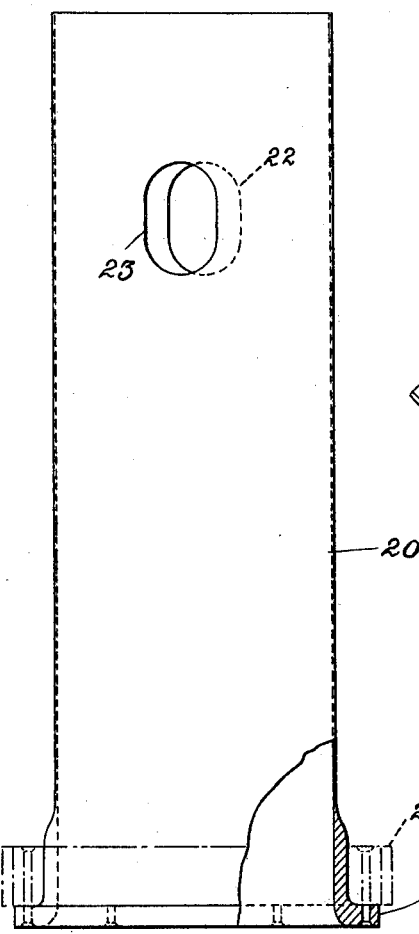
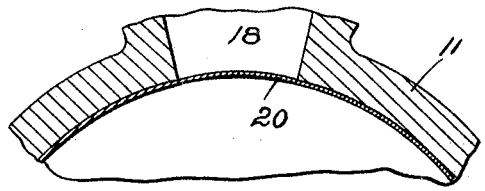
Inventor
Warren Noble
by Wright, Brown, Quinby & Hay
Attorneys

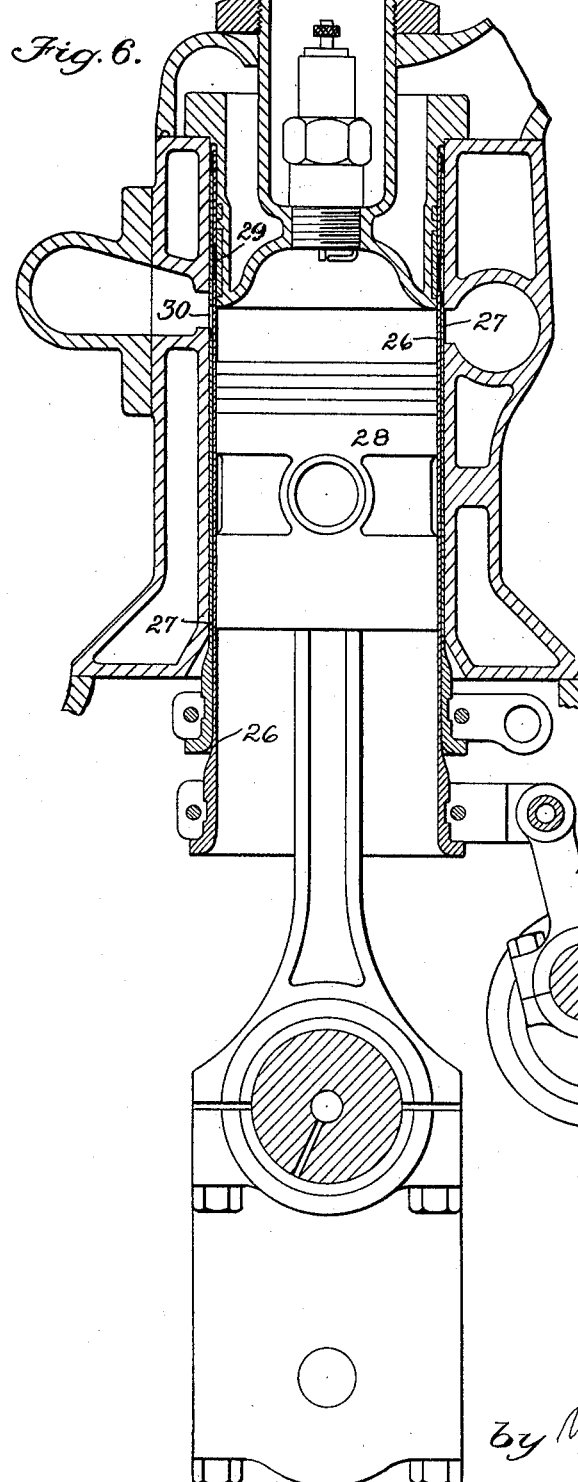
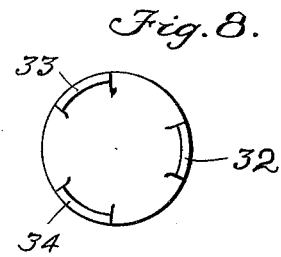
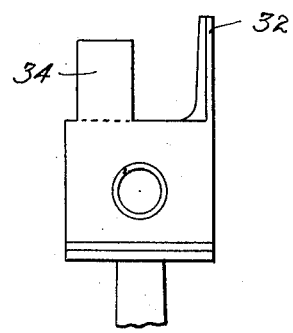
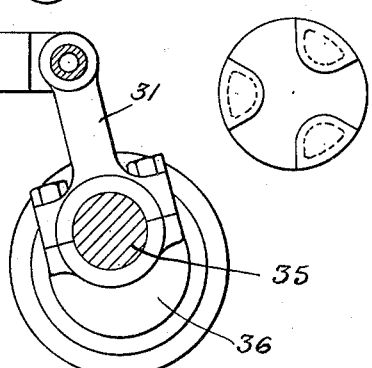

UNITED STATES PATENT OFFICE.

WARREN NOBLE, OF PROVIDENCE, RHODE ISLAND, ASSIGNOR TO N. C. L. ENGINEERING CORPORATION, OF PROVIDENCE, RHODE ISLAND, A CORPORATION OF NEW YORK.

SLEEVE-VALVE ENGINE.

1,384,401.          Specification of Letters Patent.          Patented July 12, 1921.

Application filed May 12, 1919. Serial No. 296,391.

*To all whom it may concern:*

Be it known that I, WARREN NOBLE, a subject of the King of Great Britain, residing at Providence, in the county of Providence and State of Rhode Island, have invented new and useful Improvements in Sleeve-Valve Engines, of which the following is a specification.

The present invention relates to internal combustion engines of the type using a sleeve valve; that is, a valve which is tubular in form, surrounds the piston within the cylinder, and contains ports, which are caused to register with or to close the cylinder ports by appropriate movements of the sleeve valve, which movements may be either rotative or reciprocative. The main object and result of the invention is to furnish a sleeve valve for engines of this type, in which the wall is so thin as to be locally flexible, whereby various useful and valuable results are accomplished, as will appear from the following specification.

Another object is to provide a form of piston for sleeve valve engines, which is effective to accomplish efficient lubrication of the sleeve valve when such valve is mounted rotatively, and at the same time is balanced as to the side thrusts applied to it by the working fluid.

Referring to the drawings, in which I have illustrated the preferred construction of my improved sleeve valve and some of its possible modes of use, and have also illustrated the construction of balanced piston hereinbefore referred to:

Fig. 2 is a cross section of the cylinder, on the line 2—2 of Fig. 1.

Fig. 3 is a plan view and Fig. 4 an elevation of the flexible sleeve valve in which a part of the invention hereafter claimed consists.

Fig. 5 is a detailed sectional view, enlarged, illustrating the manner in which the flexibility of my improved sleeve valve causes the valve to close and seal the cylinder ports.

Fig. 6 is a sectional view similar to Fig. 1, illustrating a modification of the invention applied to a motor of the reciprocating sleeve valve type.

Fig. 7 is a sectional view of a piston adapted to be used in the type of motor shown in Fig. 1, and having a lubricating projection, and means for balancing the lateral pressure exerted against such projection by the working fluid.

Fig. 8 is a plan view of the piston shown in Fig. 7.

Fig. 9 is an under plan view of a construction of cylinder head adapted to be used in association with the piston shown in Figs. 7 and 8.

Figure 1:
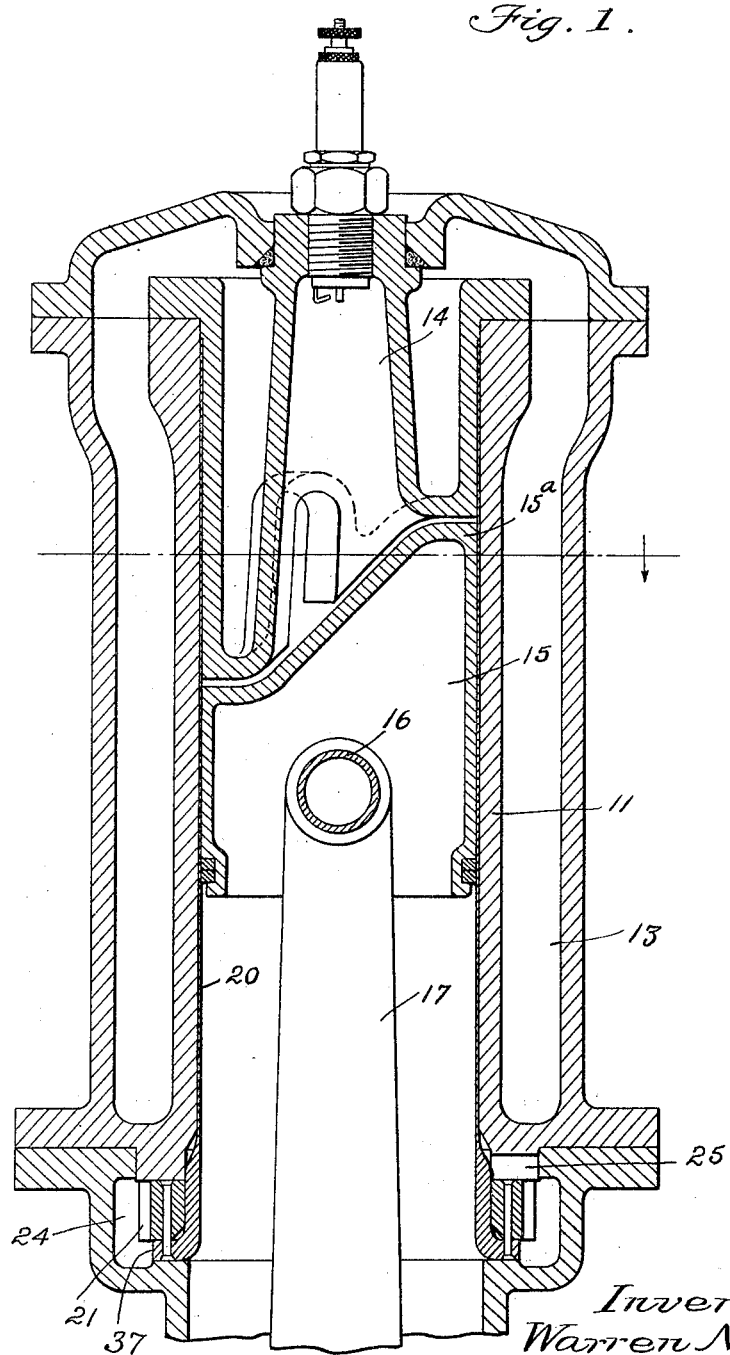
Figure 1 is an axial section of the cylinder of an internal combustion motor and of the parts working therein.

Referring first to Figs. 1 to 5 inclusive, I have shown a cylinder 11, having a water jacket 13, and a head 14, in which is contained a piston 15, carrying a wrist pin 16 for connection with a connecting rod 17. The cylinder may be of any ordinary or other satisfactory construction, and, although it is shown as water-jacketed, it may be of the air-cooled type. The cylinder contains ports 18, 19, as shown in Fig. 2, for admission of a combustible mixture of fuel and air, and for exhaust of the burned gases, respectively. The sleeve valve in which the invention particularly resides is designated 20. It occupies the interior of the cylinder and surrounds the piston. The sleeve valve now being described is rotatively mounted, and carries on its end adjacent to the crank end of the cylinder an annular gear 21, by which it may be driven through the agency of a pinion meshing with such gear.

The valve has in its opposite sides ports 22 and 23, in the same zone of the cylinder with the ports 18 and 19, and being thereby adapted to uncover the latter ports alternately in turn. In the case of an internal combustion motor operating on the four-stroke cycle, the valve is rotated at one-quarter engine speed, whereby the valve ports 22 and 23 serve in alternation to open and close the cylinder ports.

This sleeve valve is of extreme thinness as to its wall, being in practice not more than two one-hundredths of an inch in thickness, at the most, and being ordinarily as thin as fifteen one-thousandths of an inch, and in some cases even thinner. In consequence of this extreme thinness, the walls of the valve are locally flexible, and it this characteristic and the factors contributory thereto which I particularly claim as that part of the present invention which relates to the sleeve valve. The valve may be of any material capable of being given the desired qualities of thinness and flexibility and being at the same time impervious to the working fluid and sufficiently strong to resist being injured in those parts which cover the cylinder ports, when under pressure from the working fluid. As a practical matter, however, steel is the material which will ordinarily be used for making the valve.

I have not attempted to show the mechanism for rotating the valve, because various mechanisms may be used for that purpose and may be applied by the engine designer skilled in this art. Neither have I shown the valve applied to a number of cylinders in a plural cylinder engine, because the manner of use with any one cylinder is substantially the same as that in all of the cylinders. It is to be understood, however, that I do not by any means restrict the scope of the invention as to the number of cylinders in a motor which may be equipped with valves of the sort described.

In Fig. 1, the end of the valve on which the driving gear 21 is fixed is shown as being confined in an annular chamber 24, bounded by the rim of a crank case, which is connected with the end of the cylinder and forms an extension thereof. This chamber is adapted to contain oil, and to be kept supplied with oil by a pump of any desired sort operated in any suitable desired way. From the oil chamber there is a passage 25, formed as a groove cut in the end of the cylinder wall against which the gear 21 has its bearing, and leading to the clearance between the outer surface of the valve and the inner surface of the cylinder.

Fig. 6 is furnished to show the mode of applying the invention in a flexible sleeve valve to a motor of the reciprocating valve type. In this drawing two concentric sleeve valves 26 and 27 are shown, one fitting closely within the other and fitting the usual packing rings of the piston 28, and the other fitting the bore of the cylinder. These valves have ports, indicated at 29 and 30, which, when they register with each other and with the cylinder ports, control the inflow of working fluid and the exhaust of the burned gases. The valves are reciprocated by eccentrics or crank pins 35 on a valve shaft 36, and connecting rods 31. Only the eccentric and rod for the valve 26 are shown in this drawing, but it is to be understood that the valve 27 is controlled by a similar eccentric and rod.

As a result of the flexibility of the sleeve valve, the walls thereof expand against the cylinder wall under the pressure of the working fluid, and are pressed against the edges of the ports, making close surface contact with the cylinder wall all around the ports and effectually sealing the ports and preventing any leakage of the hot gases therethrough. This effect is indicated in an exaggerated way in Fig. 5, where that part of the valve wall which crosses one of the ports is shown as being somewhat distended through the port and thereby as making tight contact with the adjacent cylinder wall.

Another function of the flexibility of the sleeve valve is that of adaptation to cylinders which are out of true, either by being not perfectly round in cross section or by not being perfectly straight. Such a valve will adapt itself to untrue cylinders without the need of increasing the working clearances to the point at which the clearance absorbs the lack of circularity or of straightness. In other words, this valve achieves the condition in which the only factors which need to be known in order to secure a perfect working fit are the total periphery of the inner wall of the cylinder and the total periphery of the outer surface of the sleeve. Provided the latter is less than the former, the configuration of the cylinder is of little importance as concerns the ability of the sleeve to rotate or slide within it. While it is possible in practice to secure substantially round cylinders, it is probable that even a cylinder which is circular at normal temperature will be distorted at the port junctions and other points where the masses of metal are unequal, when heated under working conditions.

It is apparent, of course, that the sleeve valve has unbroken continuity of body and surface, except for the port openings, both circumferentially and axially, and that the performance of its functions above described is due to the capacity which its thinness and flexibility give it of yielding locally and of being distended as a whole, or in localized zones or areas, by unbalanced pressures. Thus the valve is enabled to assume positions of intimate contiguity with the confining and supporting surfaces of the cylinder, and to achieve surface contact with such surface instead of contact at a few points only, which is all that can be achieved with sleeve valves of the prior locally rigid types. This intimate contiguity is maintained when the valve moves, whether rotatably or lengthwise; and in so moving, the walls of the sleeve travel in intimate gliding contact with the cylinder walls, following deviations from truth in the cylinder in essentially the same way that a flowing stream conforms to the irregularities of its channel. Within the limits of deviation from truth in a well made engine cylinder, the sleeve valve flexes, or is distended and contracted, as it moves, and therefore has a substantially true gliding movement over the supporting surface. This quality is particularly valuable to cause sealing of a swollen cylinder port without either binding or enlarging the clearance between the sleeve valve and the cylinder wall elsewhere. In an internal combustion motor the metal inclosing the exhaust port expands under the heat of the exhaust, causing the phenomenon known as "a swollen port," where the metal of the cylinder wall surrounding the port opening is bulged inward with the effect of a local swelling. The flexible sleeve valve glides over such swollen areas, conforming to the swelling without causing displacement of the entire valve.

Thus by the use of a flexible sleeve it is possible to secure much closer fit and much less clearance than has been possible heretofore, and the danger of binding from deformation under working conditions is eliminated.

The smaller clearance made possible by the flexible type of sleeve prevents an excessive amount of lubricating oil being brought into the cylinder, and obviates tendency of the engine to smoke. Due to the small clearance and to the flexibility of the sleeve, only a film of oil is permitted to enter or remain between the outside of the sleeve and the cylinder wall. This film is being constantly renewed under the suction of the motor, but no opportunity is given for accumulation of such volume of oil as would burn and produce smoke.

Other advantages appear in that the small thickness of the sleeve wall enables a larger cylinder displacement to be secured, with closer crank centers, in multi-cylinder engines, than has been possible heretofore, which results in economy from the standpoint of construction; that the transmission of heat through the thin wall to the water-jacketed or air-cooled cylinder wall is substantially instantaneous, whereby the temperature of the sleeve corresponds closely to that of the cylinder wall itself, thus greatly aiding piston-cooling, and removing certain detrimental influences from lubrication; and finally that the sleeves are light, having small inertia, whereby the power necessary to drive them is small, and their influence upon the balance of the engine is inconsiderable. This last consideration does not apply in case of the rotating sleeve, as shown in Figs. 1 and 2, but it has considerable importance in engines equipped with reciprocating sleeve valves, as shown in Fig. 6, or those in which the movement is a combination of rotation and reciprocation.

I will observe that, while I have heretofore described only the use of the sleeve valve with internal combustion motors, it is equally applicable to all fluid pressure engines, whether the working fluid is air, steam, or the products of combustion of air and fuel. Most of the useful attributes of the flexible sleeve valve just particularly set forth apply as well to air or steam engines as to internal combustion engines; and the principles of the invention are also applicable to valves in the nature of piston valves for steam engines which are arranged otherwise than to surround the piston.

While the flexible sleeve valve which I have here described may be made in any of several different ways (wherefore I do not herein limit that feature of the invention to a sleeve valve made by any particular method), yet I prefer to make it according to a process which I have described and claimed in a companion application. The process just referred to consists in first forming a relatively short and thick walled tube, somewhat larger internally than the internal diameter of the finished sleeve, placing such tube on an arbor which has a highly polished and accurate surface throughout its whole length and of which the size is identical with that desired for the bore of the sleeve, and then hammering the tube with polished swaging dies in a rotary swaging machine. The metal is thus reduced in thickness and closely constricted on the polished arbor, and at the same time elongated, while the outer surface is formed by the polished dies to the required external diameter, by feeding the dies inward toward the arbor. Both inner and outer surfaces are thereby brought to the intended diameters and given true and smooth surfaces; and the metal is made harder and denser than at the beginning, with an exceedingly fine grain, and entirely non-porous. The sleeve thus made is finished in the making, except for the final trimming of the end, and cutting of the ports; and it may be thus finished in one operation, or in a number, comparatively small, of operations, with or without annealing intermediate the successive swaging operations, depending upon the nature of the material out of which the sleeve is made.

But, however made, the tube is preferably provided in the beginning with an outward flange 37, for attachment of the driving gear, and the wall immediately adjacent to such flange is left with sufficient thickness to sustain the flange and gear; or the collars or lugs or other attachments, by which the driving means are connected to the sleeve. The figures which I have previously named for the thickness of the sleeve wall, that is, fifteen one-thousandths of an inch, more or less, are not intended to be construed as indicating the limits of possible thickness of the sleeve wall. The minimum limit is determined by the ability of the sleeve wall to resist being distorted under the pressure of the working fluid between the port bridges so far as to be ruptured or to be cut by the edges of the ports, while the maximum limit is that beyond which the sleeve has not the local flexibility necessary to enable it to expand locally under the pressure applied by the working fluid.

In the drawings herewith presented the sleeve valve shown for illustration is represented in its full size. Its diameter is somewhat over two inches, and hence the ratio which its thickness of wall bears to its diameter is under 1%. A sleeve valve in which the ratio of wall thickness to diameter is so limited is one of the features of my invention to which I make claim.

The type of piston preferably used with the rotating type of sleeve valve has an extension on one side, as shown at 15ª, Fig. 1, and designated 32 in Figs. 7 and 8. This extension passes across the zone of the innermost part of the cylinder head, and is provided in order to lubricate that part of the sleeve valve which lies between the inwardly-projecting cylinder head and the cylinder walls. A construction of piston and cylinder head substantially as shown in Fig. 1, in combination with a rigid sleeve valve, is shown in my prior Patent 1,208,359. In combination with a rigid valve, the extension of the piston has a useful function, as set forth in said prior patent, which is to cause a certain displacement of the valve laterally by lateral pressure. With the flexible sleeve herein described, such displacement is neither possible nor necessary, and therefore, while I retain the lubricating projection 32, as shown in Fig. 8, I provide also other projections 33 and 34, the function of which is to balance the side thrust exerted by the working fluid upon the projection 32. The combined areas of these projections 33 and 34 are made such as to accomplish the desired balancing effect; and, provided this effect is accomplished, such projections need not be as long as the projection 32. As a result of the feature last described, the piston is reciprocated in sufficiently perfect lateral balance, and without objectionable tendency to bear with greater force against one side of the cylinder than against other sides.

What I claim and desire to secure by Letters Patent is:

1. In an engine, the combination with a ported cylinder and a piston therein, of a sleeve valve within the cylinder and surrounding the piston, said sleeve valve having a port opening and being flexible and distensible, whereby it travels in intimate gliding surface contact, as a stream in its channel, with the confining walls of the cylinder.

2. In an engine the combination with a ported cylinder and a piston therein, of a sleeve valve within the cylinder and surrounding the piston, having unbroken continuity of mass and surface outside of the port opening or openings, and being locally flexible and distensible, whereby it is caused by the pressure of confined working fluid to conform to the supporting cylinder walls, both where such walls depart from truth, and elsewhere, and to travel in intimate gliding contact with such walls.

3. In an engine having a piston and a cylinder with ports, a sleeve valve surrounding the piston within the cylinder, constructed and movable to cover and uncover the cylinder ports, and having such flexibility that it expands locally under the pressure of the working fluid and seals said ports when covering them.

4. An engine comprising a piston, a cylinder and a sleeve valve within the cylinder and surrounding the piston, the cylinder having ports which are controlled by the movement of said valve, and said valve being of metal and having walls so thin as to be locally flexed and distended under the pressure of the working fluid.

5. An engine comprising a piston, a cylinder and a sleeve valve within the cylinder and surrounding the piston, the cylinder having ports which are controlled by the movement of said valve, and said valve being of metal and having walls so thin that they are flexible locally whereby to conform with irregularities in the contours of the cylinder walls.

6. In an engine having a cylinder and a piston, a sleeve valve surrounding the piston within the cylinder and having thin walls, the thickness of which is in the neighborhood of two one-hundredths of an inch.

7. A sleeve valve engine comprising a cylinder, a piston, and a sleeve valve surrounding the piston within the cylinder and having a port, said sleeve valve being of metal, compact, impervious to passage of gas and continuous in mass and bearing surface in all parts except its port opening, fitting both the piston and the cylinder with minimum clearance, and being so thin as to its walls that such walls are flexible.

8. A metal sleeve valve in which the thickness of wall is less than 1% of the diameter.

9. In a sleeve valve engine, the sleeve valve having non-porous walls of a thickness the order of magnitude of which approximates two one-hundredths of an inch or less.

10. In a sleeve valve engine, the sleeve valve having relatively thin and flexible walls, said valve being relatively thick and rigid at one end, whereby such end is adapted to support power-applying means.

11. An engine valve in tubular form having walls of such slight thickness that they are distensible locally by excess of internal working pressure over external pressure.

12. A valve means comprising a chamber and a valve therein, and in which seating of the valve is effected by its local distortion under a difference between the internal and external pressures acting on said valve.

13. A valve mechanism comprising a cylindrical chamber having a port, and a sleeve valve within said chamber coöperating with said port to open and close it, said sleeve valve having such flexibility as to its walls that it effects sealing of the port by local distortion of that part of its wall which crosses the port in consequence of excess of internal pressure over the external pressure to which the valve is subjected.

14. A valve means comprising the combination of a chamber having rigid walls and a port, with a sleeve valve fitting said chamber wall and being movable so as to cover and uncover said port, said sleeve valve having walls of such thinness as to be locally flexible, whereby the port is sealed by distortion of that part of the valve wall which crosses it, by unbalanced fluid pressure acting against the valve toward the chamber wall.

In testimony whereof I have affixed my signature.

WARREN NOBLE.